May 14, 1963　　　J. F. REUTHER　　　3,089,998
REGULATOR SYSTEM
Filed April 15, 1959
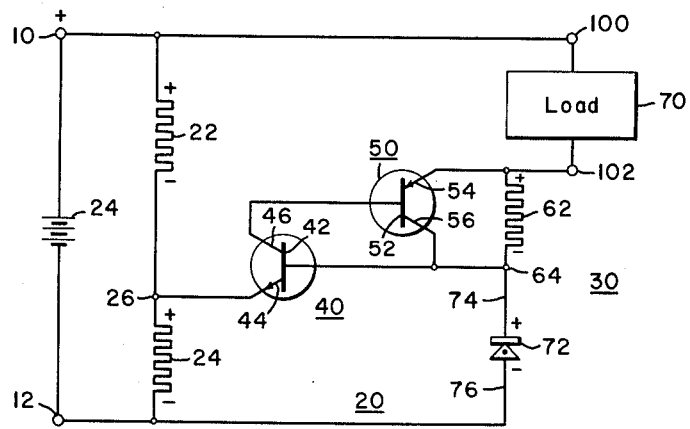
Fig. I
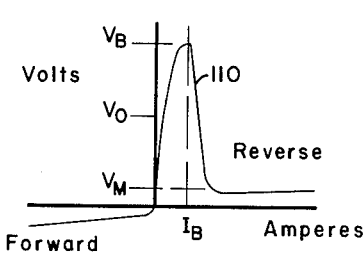
Fig. 2
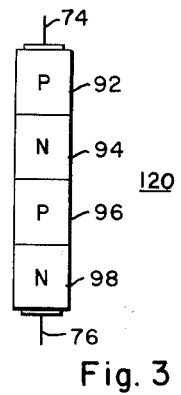
Fig. 3
WITNESSES
John E. Heasley, Jr.
Clement L. McHale
INVENTOR
John F. Reuther
BY
F. E. Browder
ATTORNEY United States Patent Office 3,089,998
Patented May 14, 1963

3,089,998
REGULATOR SYSTEM
John F. Reuther, Penn Hills, Pa., assignor to Westinghouse Electric Corporation, East Pittsburgh, Pa., a corporation of Pennsylvania
Filed Apr. 15, 1959, Ser. No. 806,701
11 Claims. (Cl. 323—22)

This invention relates to regulator systems and more particularly to current regulator systems.

In many types of electrical control apparatus, such as voltage regulators, speed regulators and telemetering equipment, current regulators or references are often employed. Conventional current regulators or references, which are preferably of the static type, often require compensation for changes in environmental conditions, such as temperature. It is therefore desirable to provide a current regulator system or reference circuit which provides a more stable output current with minimum variations in said output current with changes in environmental condition, such as temperature.

It is an object of this invention to provide a new and improved current regulator system employing static devices.

Another object of this invention is to provide a new and improved current reference circuit for use with associated electrical control apparatus.

A more specific object of this invention is to provide a current regulator system for maintaining the current supplied to a load circuit from a source of unidirectional current at substantially a predetermined value, said regulator system including a semiconductor device having a negative resistance region in its voltage-current characteristic.

Other objects of the invention will, in part, be obvious and will, in part, appear hereinafter.

For a fuller understanding of the nature and objects of the invention, reference should be had to the following detailed description taken in connection with the accompanying drawing, in which:

FIGURE 1 is a schematic diagram illustrating a first embodiment of the invention;

FIG. 2 is a curve diagram relating to FIG. 1, and;

FIG. 3 is a partial schematic diagram of a second embodiment of the invention.

Referring now to the drawing and FIG. 1 in particular, there is illustrated a current regulator system or reference circuit 30 for maintaining the current supplied from a source of unidirectional current, more specifically, the battery 24, as illustrated, to a load circuit including a load 70 at substantially a predetermined value. It is to be understood that the source or battery 24 is representative of any source of unidirectional current which may include a rectified alternating current. In general, the regulator system 30 comprises a semiconductor device, specifically the semiconductor diode 72 having a negative resistance region in its voltage-current characteristic, said semiconductor device being connected in series with the load 70 and means for maintaining the current through the diode 72, which is substantially the same as the current through the load 70, at substantially a predetermined value.

In particular, the current regulator system 30 includes the semiconductor diode 72 and an auxiliary regulator loop 20 for maintaining the operating voltage across the diode 72 in the negative resistance region of its voltage-current characteristic to thereby maintain current flow through said diode at substantially a predetermined value. The diode 72 may be of the type described in the paper "The Dynistor Diode, a New Device for Power Control," by A. P. Kruper, which was presented at the 21st Annual Machine Tool Electrification Forum in Buffalo, New York, on April 24, 1957, and in U.S. Patent 2,953,693 filed February 27, 1957, by J. Philips and assigned to the same assignee as the present application. Referring to FIG. 2, the voltage-current characteristic or volt-ampere of the diode 72 is shown. When the reverse voltage applied to the diode 72 is gradually increased until it exceeds a breakdown value, as indicated at $V_B$ in FIG. 2, a negative resistance region, as indicated at 110 in FIG. 2, follows until the voltage across the diode 72 decreases to a minimum value, as indicated at $V_M$ in FIG. 2. In other words, the diode 72 has a negative resistance region in its reverse voltage-current characteristic between the breakdown voltage $V_B$ and the minimum voltage $V_M$, after a voltage in excess of the breakdown voltage $V_B$ is applied to the diode 72. Although the negative resistance region of the voltage-current characteristic of the diode 72 is somewhat exaggerated in FIG. 2, it is assumed that the slope of the negative resistance region of said characteristic has a finite value. It has been found that a rather stable breakdown current $I_B$ is associated with the operation of the diode 72 in the negative resistance region 110 of its voltage-current characteristic. In particular, if the operating voltage across the diode 72 is maintained between the breakdown voltage $V_B$ and the minimum voltage $V_M$, preferably approximately halfway between said voltages as indicated at $V_O$, the current flow through the diode 72 will be substantially equal to the current $I_B$ or substantially equal to a predetermined value. The auxiliary regulator loop 20, which is shown in FIG. 1, therefore is provided in order to maintain the operating voltage across the diode 72 at a value between the breakdown voltage $V_B$ and the minimum voltage $V_M$, after a voltage in excess of the breakdown voltage $V_B$ has been applied to the diode 72.

In particular, the load 70 at the terminals 100 and 102 is connected in series circuit relation with the series resistor 62 and the diode 72, the series circuit being connected to or across a source of unidirectional or direct current 24 at the terminals 10 and 12, which are the positive and negative terminals, respectively, of said source.

The auxiliary regulator loop 20 for maintaining the operating voltage across the diode 72 in the negative resistance region of the voltage-current characteristic of said diode or between the breakdown voltage $V_B$ and the minimum voltage $V_M$ associated with said diode, comprises a voltage or potential dividing resistance network including the resistors 22 and 24 and the first and second transistors 40 and 50, respectively. The resistors 22 and 24, which comprise the voltage dividing resistance network, are connected in series circuit relationship, the series circuit being connected across the source of direct current 24 at the terminals 10 and 12. The first and second transistors 40 and 50, respectively, include the base electrodes 42 and 52, the emitter electrodes 44 and 54 and the collector electrodes 46 and 56, respectively. As illustrated, the first transistor 40 is of the NPN type and the second transistor 50 is of the PNP type. The emitter 44 of the first transistor 40 is connected to the common terminal 26 between the resistors 22 and 24 and the base of said transistor is connected to the common terminal 64 between the resistor 62 and the diode 72. The collector 46 of the first transistor 40 is directly connected to the base 52 of the second transistor 50 so that the current which flows in the collector-emitter path of the first transistor 40 is the same as the current which flows in the base 52 of the second transistor 50. The collector 56 of the second transistor 50 is also connected to the common terminal 64 along with the base 42 of the transistor 40. The emitter 54 of the second transistor 50 is connected to the upper end of the resistor 62 at the terminal 102 so that the current which flows in the emitter-collector path of the transistor 50 shunts or parallels the resistor 62.

The operation of the auxiliary regulator loop 20 in maintaining the operating voltage across the diode 72 in the negative resistance region of its voltage-current characteristic or between the breakdown voltage $V_B$ and the minimum voltage $V_M$ associated with said diode will now be considered. In general, the first transistor 40 functions as an error detector for comparing the voltage across the diode 72 with the voltage across the resistor 24 in order to obtain a net difference output signal or current which is a measure of the difference between the voltage across the diode 72 and the resistor 24, respectively. The second transistor 50 then operates as a directly coupled amplifier to amplify the output difference signal from the first transistor 40 and to bypass or shunt sufficient current around the series resistor 62 to maintain the operating voltage across the diode 72 between the breakdown voltage $V_B$ and the minimum voltage $V_M$.

In particular, under the initial equilibrium conditions of the auxiliary regulator loop 20, the voltage across the diode 72 is arranged to be slightly higher than the voltage across the resistor 24. It is to be noted that the diode 72 is poled in the reverse direction with respect to the voltage associated with the source 24 and that the voltage applied to the diode 72 during operation is initially in excess of the breakdown voltage $V_B$ associated with said diode. Under the equilibrium conditions just described, when the voltage across the diode 72 is larger than the voltage across the resistor 24, the voltage at the terminal 64 is at a positive polarity with respect to the voltage at the terminal 26. A small input signal or current is therefore applied to the first transistor 40 and a small current flows from the terminal 64 into the base 42 and out of the emitter 44 of the transistor 40 to the terminal 26. The latter input current is amplified by the transistor 40, the amplified current flowing in the collector-emitter path of the transistor 40. In particular, the latter amplified current flows from the load terminal 102 into the emitter 54 and out of the base 52 of the transistor 50, into the collector 46 and out of the emitter 44 of the transistor 40 to the terminal 26. The latter amplified current serves or functions as an input signal to the transistor 50 and the input current or signal which flows from the emitter 54 to the base 52 of the transistor 50 is further amplified by the transistor 50, the further amplified current flowing from the terminal 102 into the emitter 54 and out of the collector 56 to the terminal 64 at the lower end of the resistor 62. The final amplified current flowing in the emitter-collector path of the transistor 50 shunts or parallels the current path through the resistor 62 and is responsive to the difference between the voltage across the diode 72 and the resistor 24, respectively.

In summary, under the initial equilibrium conditions, the voltage across the diode 72 is slightly higher than the voltage across the resistor 24 and a small input current flows in the transistor 40 which is responsive to said difference in voltages. The output difference signal of the transistor 40 is amplified by the transistor 50 and the amplified current is bypassed around the series resistor 62. Under equilibrium conditions, the current flowing out of the emitter of the transistor 40 is relatively small and the current through the load 70 is substantially equal to the current through the diode 72.

Assuming that the operating voltage across the diode 72 at equilibrium conditions is approximately equal to $V_O$, as shown in FIG. 2, which is maintained across said diode by the auxliary regulator loop 20, the diode 72 will be operating in the negative resistance region of its voltage-current characteristic, as indicated at 110 in FIG. 2. If the voltage across the diode 72 should tend to increase above the value of operating voltage maintained by the auxiliary regulator loop 20, the voltage at the terminal 64 will become more positive with respect to the voltage at the terminal 26. The input current or signal applied to the transistor 40 will therefore increase and the corresponding amplified current bypassed around the resistor 62 by the transistor 50 will also tend to increase. Since the diode 72 is operating in its negative resistance region, an increase in the current through the diode 72 resulting from an increase in the amplified current bypassed around the resistor 62 by the transistor 50 will result in a lower voltage across the diode 72, returning or restoring the voltage across the diode 72 to substantially its original operating value.

On the other hand, if the operating voltage across the diode 72 tends to decrease below the value maintained by the auxiliary loop 20, which is preferably as indicated at $V_O$ in FIG. 2, the voltage at the terminal 64 will be less positive with respect to the voltage at the terminal 26 and the input current to the transistor 40 will be decreased. The amplified current bypassed around the resistor 62 by the transistor 50, which is responsive to the output signal or current of the transistor 40, will be correspondingly reduced and tend to decrease the current flow through the diode 72. A decrease in current through the diode 72, which is operating in the negative resistance region of its voltage-current characteristic, will cause an increase in the voltage across said diode and return the voltage across the diode 72 to its original operating value.

The overall operation of the regulator system 30 depends on the operation of the auxiliary regulator loop 20. This is because by maintaining the operating voltage across the diode 72 in its negative resistance region, the current through said diode is maintained at substantially a predetermined value, as indicated at $I_B$ for the somewhat exaggerated voltage-current characteristic of the diode 72 shown in FIG. 2. Since the current through the load 70 is substantially equal to the current flow through the diode 72, the current through the load 70 is also maintained at substantially a predetermined value by the regulator system 30. It should be noted that the current through the load 70, which is connected in series circuit relation with the diode 72, differs slightly from the current through the diode 72, the difference in said currents being equal to the relatively small current flowing out of the emitter 44 of the transistor 40 in the auxiliary regulator loop 20 in response to changes in voltage across the diode 70.

It should also be noted that the operating voltage across the diode 72, which is maintained by the auxiliary regulator loop 20, varies somewhat with changes in the voltage associated with the source 24 at the terminals 10 and 12. The variations in the current through the diode 72, however, are extremely small for small variations in the voltage at the terminals 10 and 12. The variations in the voltage at the terminals 10 and 12 will not substantially effect the operation of the auxiliary regulator loop 20 and the overall current regulator system 30, as long as the voltage across the resistor 24 and corresponding operating voltage maintained across the diode 72 by the auxiliary regulator loop 20 is in the negative resistance region of the voltage-current characteristic of the diode 72, which is approximately midway between the breakdown voltage $V_B$ and the minimum voltage $V_M$ associated with said diode. It should be noted that in one respect the auxiliary regulator loop 20, in cooperation with the series resistor 62, operates to provide an effective variable impedance or resistance in series with the load 70 and the diode 72 in response to changes in the voltage across the diode 72, in order to maintain the operating voltage across said diode at substantially a desired predetermined value.

It is to be understood that other types of semiconductor devices having a negative resistance region in their overall voltage-current characteristics, similar to that of the semiconductor diode 72, may be incorporated in a regulator system as disclosed. For example, a three-terminal semiconductor transistor switch, such as disclosed in copending application Serial No. 649,038, filed by John Philips and assigned to the same assignee as the present application, may be substituted for the semiconductor diode 72 shown in FIG. 1. The latter semiconductor device has a controllable reverse breakdown voltage and a negative resistance region in its voltage-current characteristic. The reverse breakdown voltage of the latter device is determined by a control voltage applied to two of its three terminals. The other terminal of said device and a common terminal of said device would be connected between the conductors 74 and 76, as shown in FIG. 1 between the terminal 64 and the negative terminal 12 of the source 24.

Another example of a semiconductor device of the two terminal type having a negative resistance region in its voltage-current characteristic which may be substituted for the semiconductor diode 72 is disclosed in United States Patent No. 2,855,524. The latter device, which is described as a semiconductive switch, is shown generally in FIG. 3 and would be connected between the conductors 74 and 76 in FIG. 1 in an alternate embodiment of this invention. Briefly, the device 120 shown in FIG. 3 comprises four zones 92, 94, 96 and 98 in succession, contiguous zones being of opposite conductivity type, whereby there results the PNPN structure illustrated in FIG. 3. The latter device is described in U.S. Patent No. 2,855,524 in greater detail. It is also to be understood that additional transistor amplifiers may be added to or cascaded with the transistors shown in FIG. 1 in order to provide closer regulation by the overall current regulator system 30, shown in FIG. 1. It should be noted that, in a particular application, the load 70 may be connected directly in series with the diode 72 between the terminal 64 and the conductor 76 with another resistor connected between the terminals 100 and 102 and with a suitable change in the resistors 22 and 24.

The apparatus embodying the teachings of this invention has several advantages. For example, in a current regulator system or reference circuit as disclosed, the regulated current or current reference is more stable with respect to changes in environmental conditions, such as temperature, and therefore, the requirements for compensating for changes in environmental conditions are reduced. In addition, a current regulator system or reference circuit as disclosed employs only static devices and therefore requires only a minimum of maintenance. It should be noted that a current regulator system or reference circuit, as disclosed, employing semiconductor devices would also have additional advantages over similar regulator systems, such as those of the magnetic amplifier type, in particular applications, such as in aircraft, with respect to size and weight.

Since numerous changes may be made in the above described apparatus and circuits, and different embodiments of the invention may be made without departing from the spirit and scope thereof, it is intended that all the matter contained in the foregoing description or shown in the accompanying drawing, shall be interpreted as illustrative and not in a limiting sense.

I claim as my invention:

1. In a regulator system for maintaining the current supplied from a source of unidirectional current to a load at substantially a predetermined value, the combination comprising, a semiconductor device having a negative resistance region in its reverse volt-ampere characteristic, the current through said device in its negative resistance region being at substantially a predetermined value, said device being connected in series circuit relation with said load, and means connected in circuit relation between said source and said device for maintaining the operation of said device in its negative resistance region to maintain the current through said load at substantially said predetermined value.

2. In a regulator system for maintaining the current supplied from a source of unidirectional current to a load at substantially a predetermined value, the combination comprising, a semiconductor diode having a negative resistance region in its reverse volt-ampere characteristic, the current through said diode in its negative resistance region being at substantially a predetermined value, said diode being connected in series circuit relation with said load, and means in circuit relation between said diode and said source for maintaining the operation of said diode in its negative resistance region to thereby maintain the current supplied to said load at substantially a predetermined value.

3. In a regulator system for maintaining the current supplied from a source of unidirectional current to a load at substantially a predetermined value, the combination comprising, a semiconductor device having a negative resistance region in its reverse voltage-current characteristic between a breakdown voltage and a minimum voltage after the voltage applied to said device exceeds said breakdown voltage, the current through said device in its negative resistance region being at substantially a predetermined value, said device being connected in series with said load, and an auxiliary voltage regulator system connected in circuit relation with said source and said device for maintaining the operating voltage of said device in its negative resistance region between said breakdown voltage and said minimum voltage.

4. In a regulator system for maintaining the current supplied from a source of unidirectional current to a load at substantially a predetermined value, the combination comprising, a semiconductor diode having a negative resistance region in its reverse voltage-current characteristic between a breakdown voltage and a minimum voltage after the voltage applied to said diode exceeds said breakdown voltage, the current through said diode in the negative resistance region being at substantially a predetermined value, said diode being connected in series with said load, and a voltage regulator system for maintaining the operating voltage of said diode in its negative resistance region between said breakdown voltage and said minimum voltage.

5. In a regulator system for maintaining the current supplied from a source of unidirectional current to a load at substantially a predetermined value, the combination comprising, a semiconductor diode having a negative resistance region in its reverse voltage-current characteristic between a breakdown voltage and a minimum voltage after the voltage applied to said diode exceeds said breakdown voltage, an impedance, said diode and said impedance being connected in series with said load, first means connected in circuit relation with said source and said diode for comparing the voltage across said diode with at least a portion of the voltage across said source to obtain a difference signal, and second means connected between said first means and said impedance for varying the current flow through said impedance in response to said difference signal to maintain the operatiing voltage across said diode in its negative resistance region between said breakdown voltage and said minimum voltage at a value substantially midway therebetween.

6. In a regulator system for maintaining the current supplied from a source of unidirectional current to a load at substantially a predetermined value, the combination comprising, a semiconductor diode having a negative resistance region in its reverse voltage-current characteristic, the current through said diode in the negative resistance region being at substantially a predetermined value, an impedance, said diode and said impedance being connected in series with said load, first means connected in circuit relation with said source and said diode for comparing the voltage across said diode with at least a portion of the voltage across said source to obtain a difference signal, and amplifying means connected between said first means and said impedance for varying the current flow through said impedance in response to said difference signal to maintain the operating voltage across said diode in its negative resistance region.

7. In a regulator system for maintaining the current supplied from a source of unidirectional current to a load at substantially a predetermined value, the combination comprising, a semiconductor diode having a negative resistance region in its reverse voltage-current characteristic, the current through said diode in its negative resistance region being at substantially a predetermined value, an impedance, said diode and said impedance being connected in series with said load, first means connected in circuit relation with said source and said diode for comparing the voltage across said diode with at least a portion of the voltage across said source to obtain a difference signal, said first means comprising a transistor, and amplifying means connected between said first means and said impedance for varying the current flow around said impedance in response to said difference signal to maintain the operating voltage across said diode in its negative resistance region, said second means comprising at least one transistor.

8. In a regulator system for maintaining the current supplied from a source of unidirectional current to a load at substantially a predetermined value, the combination comprising, a semiconductor device having a negative resistance region in its reverse voltage-current characteristic, the current through said device in its negative resistance region being at substantially a predetermined value, a first resistor, said first resistor and diode being connected in series with said load across said source, a voltage dividing resistance network connected across said source, a first transistor connected in circuit relation with said network and said device to be responsive to the difference between the voltage across said device and the voltage across a portion of said network and a second transistor connected in circuit relation with said first resistor and said first transistor to vary the voltage across said resistor in acocrdance with the difference voltage and to maintain the operating voltage across said device in the negative resistance region.

9. In a regulator system for maintaining the current supplied from a source of unidirectional current to a load at substantially a predetermined value, the combination comprising, a semiconductor diode having a negative resistance region in its reverse voltage-current characteristic between a breakdown voltage and a minimum voltage after the voltage applied to said diode exceeds said breakdown voltage, the current through said diode in the negative resistance region being at substantially a predetermined value, a first resistor, said first resistor and diode being connected in series with said load across said source, a voltage dividing resistance network connected across said source, a first transistor connected in circuit relation with said network and said diode to be responsive to the difference between the voltage across said diode and the voltage across a portion of said network and a second transistor connected in circuit relation with said first resistor and said first transistor to vary the voltage across said resistor in accordance with the difference voltage and to maintain the operating voltage across said diode in the negative resistance region between said breakdown voltage and said minimum voltage.

10. A regulator system for maintaining the current supplied from a source of unidirectional current to a load at substantially a predetermined value, comprising a semiconductor diode having a negative resistance region having a slope of finite value in its reverse voltage-current characteristic for applied voltages above a breakdown voltage, the current through said diode in its negative resistance region being at substantially a predetermined value for applied voltages between said breakdown voltage and a minimum voltage after said breakdown voltage is exceeded, a first resistor connected in series with said load and said diode, the latter series circuit being connected across said source, second and third resistors connected in series across said source, a first transistor connetcted in circuit relation with said third resistor and said diode to provide an output signal which varies with the difference between the voltage across said third resistor and the voltage across said diode, and a second transistor connected in circuit relation between said first transistor and said first resistor to amplify said output signal and to shunt sufficient current around said first resistor to maintain said diode in its negative resistance region.

11. A regulator system for maintaining the current supplied from a source of unidirectional current to a load at substantially a predetermined value, comprising a semiconductor diode having a negative resistance region having a slope of finite value in its reverse voltage-current characteristic for applied voltages above a breakdown voltage, the current through said diode in its negative resistance region being at substantially a predetermined value for applied voltages between said breakdown voltage and a minimum voltage after said breakdown voltage is exceded, a first resistor connected in series with said load and said diode, the latter series circuit being connected across said source, second and third resistors connected in series across said source, a first transistor connected in circuit relation with said third resistor and said diode to provide an output signal which varies with the difference between the voltage across said third resistor and the voltage across said diode, and a second transistor connected in circuit relation between said first transistor and said first resistor to amplify said output signal and to shunt sufficient current around said first resistor to maintain the voltage across said diode between said breakdown voltage and said minimum voltage in its negative resistance region, the emitter-collector path of said second transistor being connected in parallel with said first resistor.

References Cited in the file of this patent
UNITED STATES PATENTS

| | | |
|---|---|---|
| 2,751,549 | Chase | June 19, 1956 |
| 2,776,382 | Jensen | Jan. 1, 1957 |
| 2,855,524 | Shockley | Oct. 7, 1958 |
| 2,965,772 | Swartout | Dec. 20, 1960 |